US010113666B2

(12) United States Patent
Roodenburg et al.

(10) Patent No.: US 10,113,666 B2
(45) Date of Patent: Oct. 30, 2018

(54) MARINE PIPELAYING SYSTEM AND METHOD FOR LOWERING AND/OR RAISING AN OFFSHORE PIPELINE AND INCLUDING ONE OR MORE ACCESSORIES THERETO

(71) Applicant: ITREC B.V., Schiedam (NL)

(72) Inventors: Joop Roodenburg, Schiedam (NL); Terence Willem August Vehmeijer, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 15/524,577

(22) PCT Filed: Nov. 24, 2015

(86) PCT No.: PCT/NL2015/050817
§ 371 (c)(1),
(2) Date: May 4, 2017

(87) PCT Pub. No.: WO2016/085332
PCT Pub. Date: Jun. 2, 2016

(65) Prior Publication Data
US 2018/0245714 A1      Aug. 30, 2018

(30) Foreign Application Priority Data
Nov. 27, 2014   (NL) ...................................... 2013894

(51) Int. Cl.
*F16L 1/20*     (2006.01)
*B63B 35/03*   (2006.01)
*F16L 1/16*     (2006.01)

(52) U.S. Cl.
CPC .............. *F16L 1/207* (2013.01); *B63B 35/03* (2013.01); *F16L 1/16* (2013.01); *F16L 1/166* (2013.01); *F16L 1/205* (2013.01); *B63B 2734/00* (2013.01)

(58) Field of Classification Search
CPC combination set(s) only.
See application file for complete search history.

(56) References Cited

U.S. PATENT DOCUMENTS 6,524,030 B1 * 2/2003 Giovannini ............. B63B 35/03
405/166
8,894,326 B2 * 11/2014 Randrianarivony ...... F16L 1/19
405/166

(Continued)

FOREIGN PATENT DOCUMENTS

WO    WO 2004/085898 A1   10/2004
WO          1 696 163 A1    8/2005
(Continued)

*Primary Examiner* — Kyle Armstrong
(74) *Attorney, Agent, or Firm* — Birch, Stewart, Kolasch & Birch, LLP (57) ABSTRACT

A marine pipelaying system and method for lowering and/or raising an offshore pipeline and including one or more accessories thereto, includes a pipeline launch device, a pipeline clamp, an accessory connecting device and a controlled load hoisting device. An accessory handling device is provided including an accessory transport track and a cart adapted to engage and support one of the one or more accessories, such that the accessory handling device is adapted to engage said accessory at the engagement position, position the accessory in the pipeline connecting position in the firing line above the pipeline clamp. The accessory can be connected to the pipeline and support and allow displacement of the accessory between the engagement position and the pipeline connection position.

15 Claims, 5 Drawing Sheets

(56) References Cited

U.S. PATENT DOCUMENTS

| | | | |
|---|---|---|---|
| 8,992,124 B2 * | 3/2015 | Feijen | F16L 1/19 405/166 |
| 8,992,152 B2 * | 3/2015 | Nouwens | E21B 19/155 414/22.55 |
| 9,255,651 B2 * | 2/2016 | Roodenburg | F16L 1/19 |
| 9,835,268 B2 * | 12/2017 | Roodenburg | F16L 1/207 |
| 2003/0091395 A1 | 5/2003 | Stockstill | |
| 2011/0103894 A1 * | 5/2011 | Feijen | F16L 1/19 405/166 |
| 2012/0183357 A1 * | 7/2012 | Randrianarivony | F16L 1/19 405/166 |
| 2012/0195716 A1 * | 8/2012 | Nouwens | E21B 19/155 414/22.55 |
| 2015/0362091 A1 * | 12/2015 | Roodenburg | F16L 1/19 405/168.3 |
| 2016/0238158 A1 * | 8/2016 | Roodenburg | F16L 1/19 |
| 2017/0051847 A1 * | 2/2017 | Roodenburg | F16L 1/20 |
| 2017/0138508 A1 * | 5/2017 | Roodenburg | F16L 1/19 |

FOREIGN PATENT DOCUMENTS

| | | | | |
|---|---|---|---|---|
| WO | WO 2006/054891 A1 | 5/2006 | | |
| WO | WO 2006/085739 A1 | 8/2006 | | |
| WO | WO 2011/016719 A1 | 2/2011 | | |
| WO | WO 2012/091560 A2 | 7/2012 | | |
| WO | WO-2012091560 A2 * | 7/2012 | | E21B 19/155 |

* cited by examiner

MARINE PIPELAYING SYSTEM AND METHOD FOR LOWERING AND/OR RAISING AN OFFSHORE PIPELINE AND INCLUDING ONE OR MORE ACCESSORIES THERETO

The present invention relates to a marine pipelaying system and method for lowering and/or raising an offshore pipeline and including one or more accessories thereto.

In most offshore pipelines to be laid there is a need to install accessories, also referred to as modules on the ends of the pipeline and/or at one or multiple intermediate locations along the pipeline. These accessories are usually quite large and heavy and are commonly designed to be welded to the pipeline. Examples of such accessories are: initiation fittings, pipeline end terminations (PLET), branches, inline SLED assemblies, inline manifolds, pipe valves, tee assemblies with their supporting structures and mud-mats.

Such pipeline accessories should often be welded in line with the pipeline. Often the accessory has pipeline connection parts at opposed ends thereof to connect the offshore pipeline to those pipeline connection parts. It is however also known to have a pipeline accessory, e.g. a mud-mat, which is to be mounted, mostly by welding or using bolts, externally on the pipeline.

Various prior art solutions are known to include an accessory at an end of a pipeline or at an intermediate location in or on a pipeline.

For example in WO2006/085739 of the same applicant a marine pipelaying system and method for lowering and/or raising an offshore pipeline and including one or more accessories thereto according to the preamble of claim 1 is described.

The known techniques for including an accessory into or at an end of a pipeline while laying an offshore pipeline are unsatisfactory.

The object of this invention is to provide an improved technique and associated system for lowering and/or raising an offshore pipeline and including one or more accessories thereto, e.g. at an end and/or at intermediate locations of the pipeline.

The present invention provides a system according to the preamble of claim 1, wherein the accessory handling device further comprises:

- an elongated hoist beam, supported by the cart, extending horizontally and perpendicular to the accessory transport track, comprising trolley rails in the longitudinal direction of the hoist beam,
- a travelling trolley displaceable along the trolley rails, and an associated trolley drive to displace the travelling trolley along the trolley rails,
- an object suspension device, adapted to engage and support at least one of the one or more accessories,
- a hoist assembly comprising a hoist winch and an associated hoisting cable, the hoisting cable extending from the hoist winch via the travelling trolley to the object suspension device, such that upon actuation of the hoist winch the object suspension device can be raised and lowered.

An advantage of such an accessory handling device is that it is more versatile. With one or more proper chosen object suspension devices it is possible to handle and manipulate accessories having a range of different sizes, and possibly also tubulars, between the engagement position and the pipeline connection position. Furthermore, the accessory handling device may be used to handle further objects in the firing line. The hoist assembly may be operated to lift and lower from the elongated hoist beams e.g. inspection and/or maintenance tools, e.g. in combination with a working deck or workstation, e.g. for non-destructive testing (NDT) or coating the pipeline. The working area of the hoist assembly is advantageously adjacent the firing line, in particular adjacent an offshore pipeline in the firing line, e.g. in the area of a weld or other pipeline connection.

In embodiments, the elongated hoist beam is mounted pivotable to the cart via a horizontal pivot axis by an associated pivot actuator. Accordingly, the elongated hoist beam is pivotable e.g. between a horizontal operative position, and a vertical inoperative parking position.

In embodiments, the accessory handling device comprises two carts movable along a common accessory transport track, each cart comprising an elongated hoist beam and associated travelling trolley, object suspension device and hoist assembly, and wherein furthermore a control device is provided to operate both cart drives, trolley drives and hoist assemblies in cooperation. Two carts with two object suspension devices that are operable in cooperation further increases the versatility of the system. Possibly the control device also operates the pivot actuator in cooperation, allowing the accessory handling device to align the accessory in the pipeline connecting position in the firing line.

In embodiments, a control device to operate the cart drive, trolley drive and hoist assembly so as to position the accessory in the pipeline connecting position in the firing line. Such accurate positioning of the accessory, in particular with respect to a pipeline portion held by the pipeline clamp facilitates the connection process, e.g. the welding process. Such a control device makes the use of a separate line-up tool superfluous, resulting in a less complex system.

In alternative embodiments, it is still conceivable further an accessory line-up tool is provided movable over the accessory transport cart, to which the accessory is attachable and which is operable so as to position the accessory in the pipeline connecting position in the firing line.

In embodiments, the accessory handling device comprises two or more carts and a boom supported by one of the carts, the boom being provided with a gripper, wherein the boom comprises a non-rotatable boom portion connected to the cart and a rotatable boom portion comprising the gripper, which rotatable boom portion is rotatable with respect to the non-rotatable boom portion about a rotation axis of the boom, extending parallel to the firing line. Such a boom increases the versatility of the system. In advantageous embodiments, it is even conceivable that the gripper is mounted rotatable to the rotatable boom portion, e.g. about a rotation axis extending in the longitudinal direction of the rotatable boom portion. Such a gripper can e.g. be used to position objects in the engagement position and allow them to be engaged by the object suspension device.

In embodiments, the pipeline launch device comprises one or more tensioners for lowering/raising the offshore pipeline along the firing line. This is in particular common when the offshore pipeline is lowered using a reel-lay method.

In embodiments, the pipeline clamp is movable between the firing line and a remote position. This is advantageous in embodiments where the dimensions of an accessory to be lowered/raised past the pipeline clamp are significant and exceed the dimensions of an open position of the pipeline clamp.

In embodiments, the system further includes an accessory loader device for moving an accessory into said engagement position, e.g. wherein said accessory loader device is adapted to tilt said accessory from an essentially horizontal feed position into said engagement position. The accessory loader device may be mounted on a deck of the vessel, preferably adjacent to the pipe launch device. Possibly, the vessel is furthermore equipped with accessory transportation rails. Alternatively, it is also conceivable that the accessory handling device of the invention, with the elongated hoist beams, is operable to tilt an accessory from an essentially horizontal feed position into said engagement position.

The invention further relates to an accessory handling device for handling accessories to be included into or onto an offshore pipeline, an accessory handling device comprising an accessory transport track supported by the pipeline launch device above the pipeline clamp, extending horizontally and providing an engagement position and a pipeline connecting position, the accessory handling device further comprising a cart, movable along the accessory transport track via an associated cart drive, the cart being adapted to engage and support one of the one or more accessories, such that the accessory handling device is adapted to:
- engage said accessory at the engagement position,
- position said accessory in the pipeline connecting position in the firing line above the pipeline clamp, wherein the accessory can be connected to the pipeline,
- support and allow displacement of the accessory between the engagement position and the pipeline connection position, characterized in that the accessory handling device further comprises
- an elongated hoist beam, supported by the cart, extending horizontally and perpendicular to the accessory transport track, comprising trolley rails in the longitudinal direction of the hoist beam,
- a travelling trolley displaceable along the trolley rails, and an associated trolley drive to displace the travelling trolley along the trolley rails,
- an object suspension device, to which an object is connectable, and which is at least adapted to engage and support one of the one or more accessories,
- a hoist assembly comprising a hoist winch and an associated hoisting cable, the hoisting cable extending from the hoist winch via the travelling trolley to the object suspension device, such that upon actuation of the hoist winch the object suspension device can be raised and lowered.

The invention further relates to the use of the above-described accessory handling device in marine pipelaying methods for lowering and/or raising an offshore pipeline and including one or more accessories thereto.

The invention further relates to a marine pipelaying method for lowering and/or raising an offshore pipeline and including one or more accessories thereto, in particular an accessory included at a trailing end of the offshore pipeline, wherein use is made of a marine pipelaying system to be mounted on a vessel for lowering and/or raising an offshore pipeline and including one or more accessories thereto, the marine pipelaying system comprising:
- a pipeline launch device for lowering/raising the offshore pipeline along a firing line defined by the pipeline launch device,
- a pipeline clamp adapted to clamp and support the weight of a lowered portion of the offshore pipeline in the firing line,
- an accessory handling device comprising an accessory transport track supported by the pipeline launch device above the pipeline clamp, extending horizontally and providing an engagement position and a pipeline connecting position, the accessory handling device further comprising a cart, movable along the accessory transport track via an associated cart drive, the cart being adapted to engage and support one of the one or more accessories, such that the accessory handling device is adapted to:
  - engage said accessory at the engagement position,
  - position said accessory in the pipeline connecting position in the firing line above the pipeline clamp, wherein the accessory can be connected to the pipeline,
  - support and allow displacement of the accessory between the engagement position and the pipeline connection position,
- an accessory connecting device, adapted to connect the one or more accessories to the offshore pipeline,
- a controlled load hoisting device adapted to be releasably secured to one of the one or more accessories and lower/raise said accessory and a lowered portion of the offshore pipeline connected thereto, wherein the accessory handling device further comprises
- an elongated hoist beam, supported by the cart, extending horizontally and perpendicular to the accessory transport track, comprising trolley rails in the longitudinal direction of the hoist beam,
- a travelling trolley displaceable along the trolley rails, and an associated trolley drive to displace the travelling trolley along the trolley rails,
- an object suspension device, adapted to engage and support at least one of the one or more accessories,
- a hoist assembly comprising a hoist winch and an associated hoisting cable, the hoisting cable extending from the hoist winch via the travelling trolley to the object suspension device, such that upon actuation of the hoist winch the object suspension device can be raised and lowered.

wherein the method includes the steps of:
- providing a vessel with the marine pipelaying system mounted thereon,
- lowering the pipeline in the firing line from the vessel,
- clamping the pipeline with the pipeline clamp to support the weight of the lowered portion of the offshore pipeline,
- providing the accessory in the engagement position of the accessory handling device,
- engaging the accessory to the object suspension device,
- displacing the accessory from the engagement position to the pipeline connecting position in which the accessory is located above the lowered portion of the offshore pipeline in the pipeline clamp in the firing line, by operating the cart drive and moving the cart along the accessory transport track,
- connecting the accessory to the lowered portion of the offshore pipeline above the pipeline clamp, while the pipeline is held by the pipeline clamp,
- releasably securing the accessory to the controlled load hoisting device,
- transferring the weight of the accessory and the lowered portion of the offshore pipeline connected thereto from the pipeline clamp to the controlled load hoisting device while the accessory and the lowered portion of the offshore pipeline connected thereto remain in the firing line,
- disconnecting the accessory from the accessory handling device and displacing the cart away from the pipeline connecting position,
- disengaging the pipeline clamp from the pipeline, lowering the accessory and the lowered portion of the offshore pipeline connected thereto along the firing line by the controlled load hoisting device.

Optionally, the pipeline clamp is moved to a remote position prior to lowering the accessory and the lowered portion of the offshore pipeline connected thereto along the firing line by the controlled load hoisting device.

In embodiments, after having clamped the pipeline with the pipeline clamp a portion of the pipeline above the pipeline clamp has to be removed to create a free space above the pipeline, i.e. the pipeline connecting position of the accessory.

The invention further relates to a marine pipelaying method for lowering and/or raising an offshore pipeline and including one or more accessories thereto, in particular an accessory included at an intermediate part of the offshore pipeline, wherein use is made of a marine pipelaying system according to claim 1, including the steps of:
- providing a vessel with the marine pipelaying system mounted thereon,
- lowering the pipeline in the firing line from the vessel,
- clamping the pipeline with the pipeline clamp to support the weight of the lowered portion of the offshore pipeline,
- providing the accessory in the engagement position of the accessory handling device,
- engaging the accessory to the object suspension device,
- displacing the accessory from the engagement position to the pipeline connecting position in which the accessory is located above the lowered portion of the offshore pipeline in the pipeline clamp in the firing line, by operating the cart drive and moving the cart along the accessory transport track,
- connecting the accessory to the lowered portion of the offshore pipeline above the pipeline clamp, while the pipeline is held by the pipeline clamp,
- connecting the accessory to a portion of the offshore pipeline yet to be launched,
- actuating the pipeline launch device and transferring the weight of the accessory and the lowered portion of the offshore pipeline connected thereto from the pipeline clamp to the pipeline launch device while the accessory and the lowered portion of the offshore pipeline connected thereto remain in the firing line,
- disconnecting the accessory from the accessory handling device and displacing the cart away from the pipeline connecting position,
- disengaging the pipeline clamp from the pipeline,
- lowering the offshore pipeline with the accessory connected thereto along the firing line by the pipeline launch device.

The invention further relates to a marine pipelaying method for lowering and/or raising an offshore pipeline and including one or more accessories thereto, wherein use is made of a marine pipelaying system to be mounted on a vessel for lowering and/or raising an offshore pipeline and including one or more accessories thereto, in particular an accessory included at an intermediate part of the offshore pipeline, the marine pipelaying system comprising:
- a pipeline launch device for lowering/raising the offshore pipeline along a firing line defined by the pipeline launch device,
- a pipeline clamp adapted to clamp and support the weight of a lowered portion of the offshore pipeline in the firing line,
- an accessory handling device comprising an accessory transport track supported by the pipeline launch device above the pipeline clamp, extending horizontally and providing an engagement position and a pipeline connecting position, the accessory handling device further comprising a cart, movable along the accessory transport track via an associated cart drive, the cart being adapted to engage and support one of the one or more accessories, such that the accessory handling device is adapted to:
  - engage said accessory at the engagement position,
  - position said accessory in the pipeline connecting position in the firing line above the pipeline clamp, wherein the accessory can be connected to the pipeline,
  - support and allow displacement of the accessory between the engagement position and the pipeline connection position,
- an accessory connecting device, adapted to connect the one or more accessories to the offshore pipeline,
wherein the accessory handling device further comprises
- an elongated hoist beam, supported by the cart, extending horizontally and perpendicular to the accessory transport track, comprising trolley rails in the longitudinal direction of the hoist beam,
- a travelling trolley displaceable along the trolley rails, and an associated trolley drive to displace the travelling trolley along the trolley rails,
- an object suspension device, adapted to engage and support at least one of the one or more accessories,
- a hoist assembly comprising a hoist winch and an associated hoisting cable, the hoisting cable extending from the hoist winch via the travelling trolley to the object suspension device, such that upon actuation of the hoist winch the object suspension device can be raised and lowered.

wherein the method includes the steps of:
providing a vessel with the marine pipelaying system mounted thereon,
lowering the pipeline in the firing line from the vessel,
clamping the pipeline with the pipeline clamp to support the weight of the lowered portion of the offshore pipeline,
providing the accessory in the engagement position of the accessory handling device,
engaging the accessory to the object suspension device,
displacing the accessory from the engagement position to the pipeline connecting position in which the accessory is located above the lowered portion of the offshore pipeline in the pipeline clamp in the firing line, by operating the cart drive and moving the cart along the accessory transport track,
connecting the accessory to the lowered portion of the offshore pipeline above the pipeline clamp, while the pipeline is held by the pipeline clamp,
connecting the accessory to a portion of the offshore pipeline yet to be launched,
actuating the pipeline launch device and transferring the weight of the accessory and the lowered portion of the offshore pipeline connected thereto from the pipeline clamp to the pipeline launch device while the accessory and the lowered portion of the offshore pipeline connected thereto remain in the firing line,
disconnecting the accessory from the accessory handling device and displacing the cart away from the pipeline connecting position,
disengaging the pipeline clamp from the pipeline, lowering the offshore pipeline with the accessory connected thereto along the firing line by the pipeline launch device.

Optionally, the pipeline clamp is moved to a remote position prior to lowering the accessory and the lowered portion of the offshore pipeline connected thereto along the firing line by the controlled load hoisting device.

In embodiments, after having clamped the pipeline with the pipeline clamp a portion of the pipeline above the pipeline clamp has to be removed to create a free space above the pipeline, i.e. the pipeline connecting position of the accessory.

The invention further relates to a marine pipelaying method for lowering and/or raising an offshore pipeline and including one or more accessories thereto, in particular an accessory included at a leading end of the offshore pipeline, wherein use is made of a marine pipelaying system according to claim 1, including the steps of:
  providing a vessel with the marine pipelaying system mounted thereon,
  providing the accessory in the engagement position of the accessory handling device,
  engaging the accessory to the object suspension device,
  displacing the accessory from the engagement position to the pipeline connecting position in which the accessory is located above the lowered portion of the offshore pipeline in the pipeline clamp in the firing line, by operating the cart drive and moving the cart along the accessory transport track,
  connecting the accessory to an end portion of the offshore pipeline yet to be launched,
  lowering the offshore pipeline with the accessory connected thereto along the firing line by the pipeline launch device.

The invention further relates to a marine pipelaying method for lowering and/or raising an offshore pipeline and including one or more accessories thereto, in particular an accessory included at a leading end of the offshore pipeline, wherein use is made of a marine pipelaying system to be mounted on a vessel for lowering and/or raising an offshore pipeline and including one or more accessories thereto, the marine pipelaying system comprising:
  a pipeline launch device for lowering/raising the offshore pipeline along a firing line defined by the pipeline launch device,
  an accessory handling device comprising an accessory transport track supported by the pipeline launch device, extending horizontally and providing an engagement position and a pipeline connecting position, the accessory handling device further comprising a cart, movable along the accessory transport track via an associated cart drive, the cart being adapted to engage and support one of the one or more accessories, such that the accessory handling device is adapted to:
    engage said accessory at the engagement position,
    position said accessory in the pipeline connecting position in the firing line, wherein the accessory can be connected to the pipeline,
    support and allow displacement of the accessory between the engagement position and the pipeline connection position,
  an accessory connecting device, adapted to connect the one or more accessories to the offshore pipeline,
  wherein the accessory handling device further comprises an elongated hoist beam, supported by the cart, extending horizontally and perpendicular to the accessory transport track, comprising trolley rails in the longitudinal direction of the hoist beam,
  a travelling trolley displaceable along the trolley rails, and an associated trolley drive to displace the travelling trolley along the trolley rails,
  an object suspension device, adapted to engage and support at least one of the one or more accessories,
  a hoist assembly comprising a hoist winch and an associated hoisting cable, the hoisting cable extending from the hoist winch via the travelling trolley to the object suspension device, such that upon actuation of the hoist winch the object suspension device can be raised and lowered.
  wherein the method includes the steps of:
  providing a vessel with the marine pipelaying system mounted thereon,
  providing the accessory in the engagement position of the accessory handling device,
  engaging the accessory to the object suspension device,
  displacing the accessory from the engagement position to the pipeline connecting position in which the accessory is located above the lowered portion of the offshore pipeline in the pipeline clamp in the firing line, by operating the cart drive and moving the cart along the accessory transport track,
  connecting the accessory to an end portion of the offshore pipeline yet to be launched,
  lowering the offshore pipeline with the accessory connected thereto along the firing line by the pipeline launch device.

The invention further relates to a pipelaying vessel provided with a system and/or an accessory handling device as described herein.

Further embodiments of the inventive system are described in the subclaims and the description of the drawings.

Figure 1:
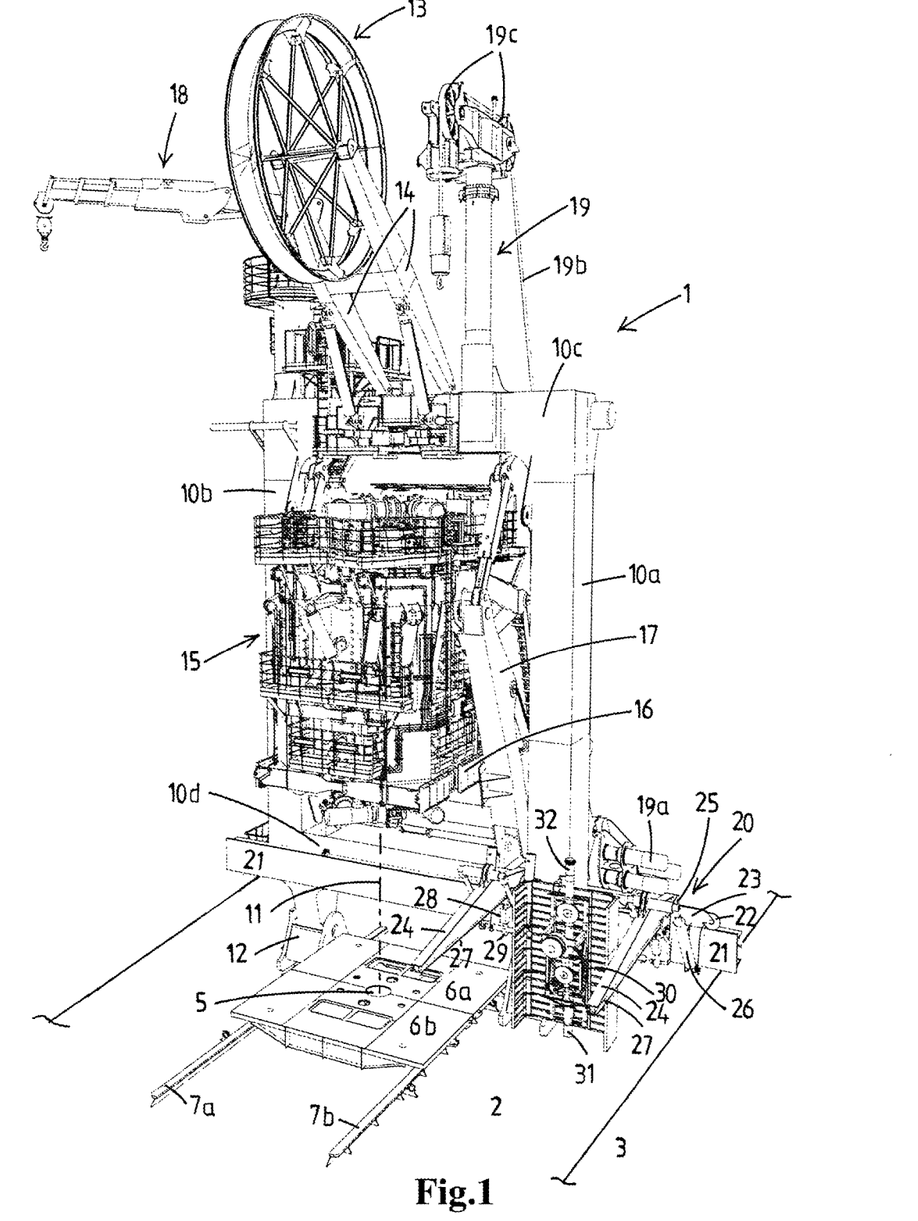
FIG. 1 shows in perspective view an example of a marine pipelaying system according to the invention, wherein the accessory handling device is in an engagement position.
Figure 2A:
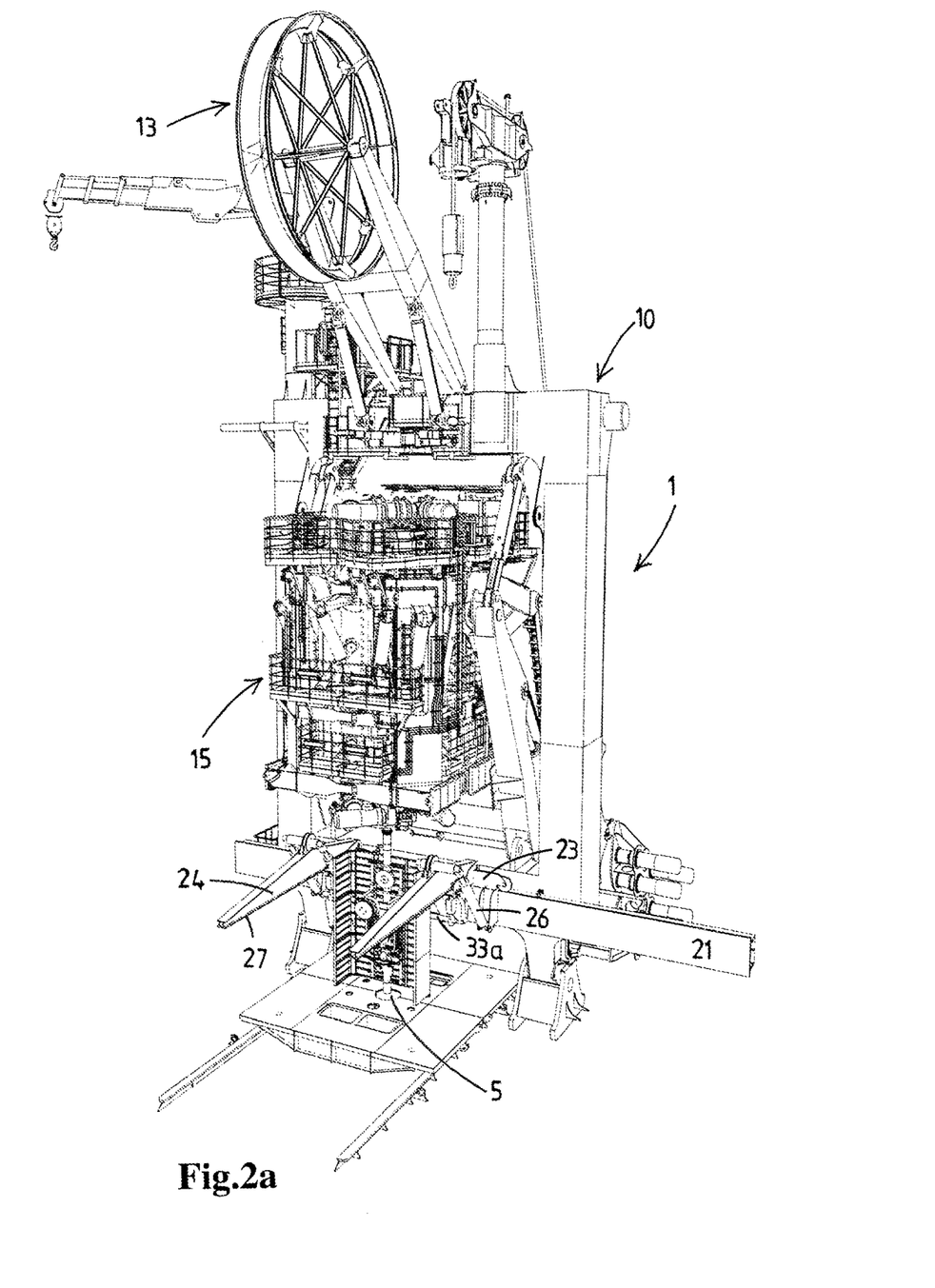
FIG. 2a shows the system of FIG. 1, in use in a pipeline connecting position.
Figure 2B:
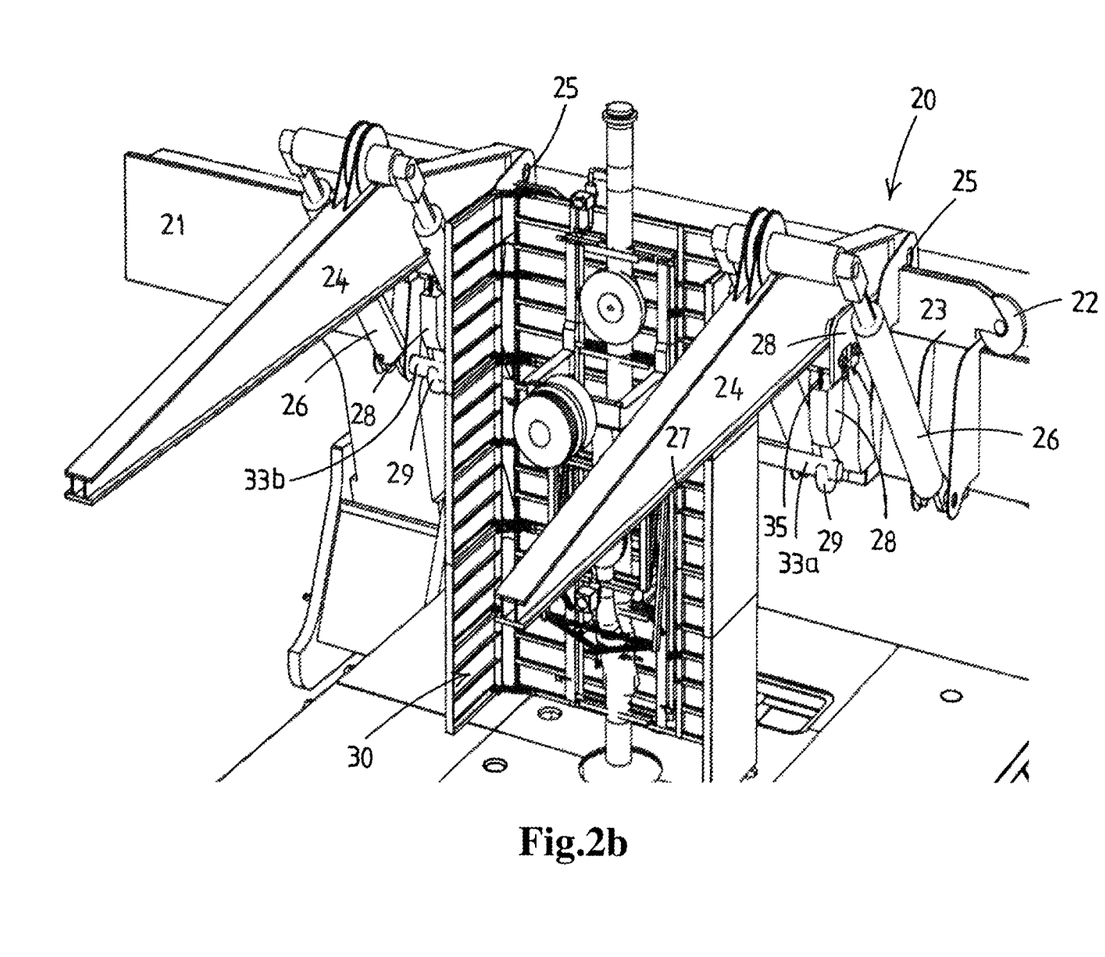
FIG. 2b shows part of the accessory handling device of FIG. 2a in detail.
Figure 3A:
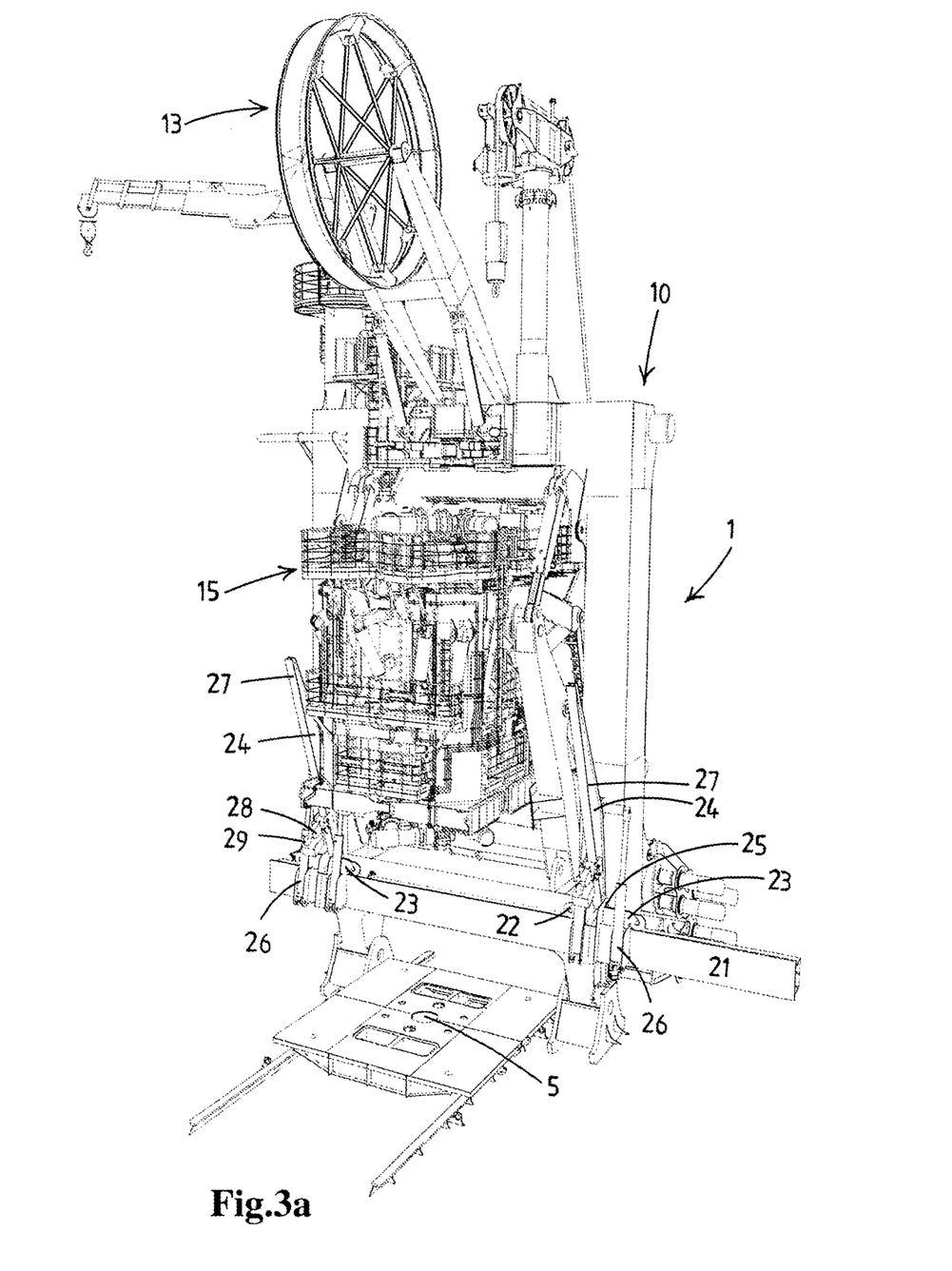
FIG. 3a shows the system of FIG. 1, with the accessory handling device in a parking position.
Figure 3B:
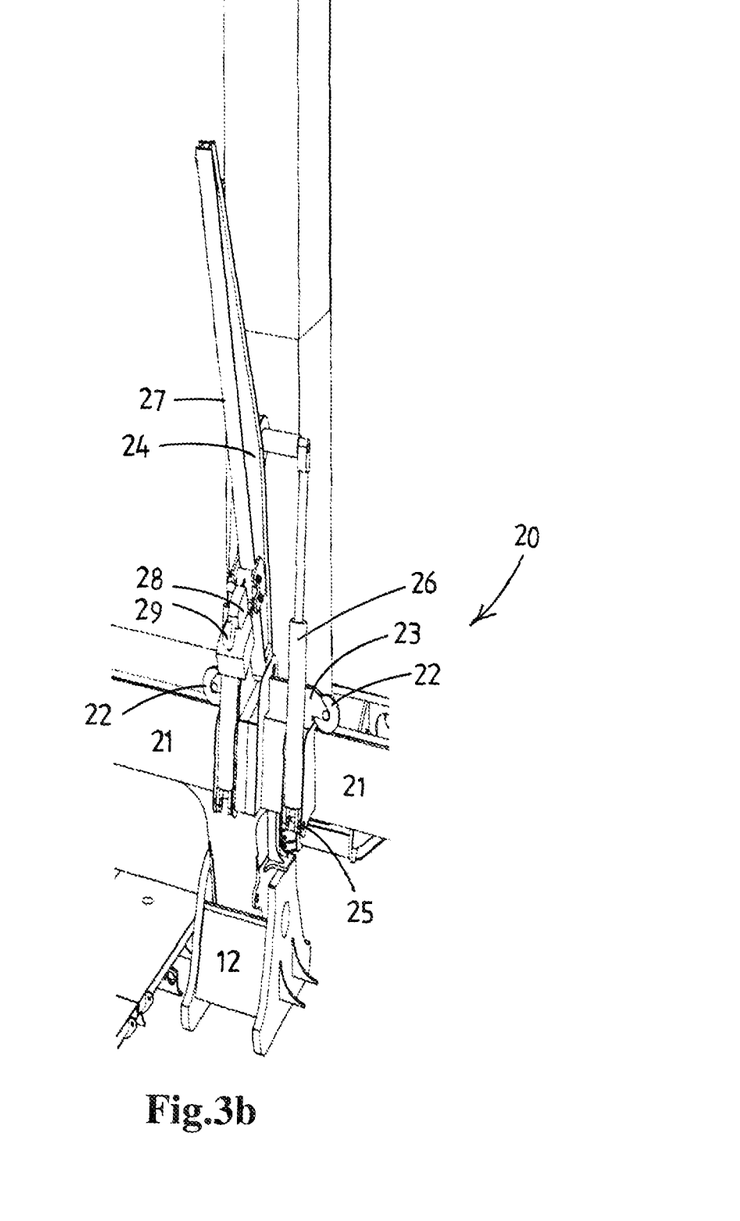
FIG. 3b shows part of the accessory handling device of FIG. 3a in detail.

In FIGS. 1-3 a possible embodiment of a marine pipelaying system 1 according to the invention is shown.

In FIG. 1, it is visible that the marine pipelaying system 1 is mounted on a deck 2 of a vessel 3 for installing an offshore pipeline (not shown) that includes one or more accessories. In the drawings, a PLET (pipeline end termination) 30 is shown. The vessel is preferably a dynamically positioned vessel, capable of moving during pipe laying process. The vessel moves forward as the pipeline is laid on the seabed. The vessel may be a mono-hull vessel, but it is also conceivable that the vessel is a semi-submersible or has a hull shape adapted to arctic circumstances.

The marine pipelaying system 1 comprises a pipeline launch device 10 for launching a pipeline (and other objects as will be explained) in a firing line 11 from the vessel 3 in the direction of the seabed.

The marine pipelaying system of the invention can be employed in combination with all sorts of offshore pipelaying techniques, in particular J-lay, reel lay and S-lay. As a floating vessel for instance any type of laybarge can be used, whether appropriate for J-lay, S-lay or reel-lay pipelaying.

In the shown embodiment, the marine pipelaying system 1 is mounted on a vessel 3 adapted to employ a reel laying method for laying an offshore pipeline. In this method the pipeline to be laid is manufactured in a continuous length on board of the pipelaying vessel or at a shore facility and then spooled onto a large spool. At the upper end of the pipeline launch device 10 a pipeline guide is arranged, here embodied as a circular pipeline guide member 13, over which the pipeline to be laid can be guided. Alternatively, a semi-circular guide member having rollers may be provided. As such the guide member 13 diverts a pipeline coming from a reel to the firing line 11, here extending along the moonpool facing side of the tower 10. The firing line 11 is essentially parallel to the tower 10 and remains so even when the tower 10 is inclined.

Pipeline guide member 13 is mounted retractably to the tower, via beams 14 which are pivotably connected to the tower 10. The retracted position of the pipeline guide member 13 is not shown in the drawings.

In an alternative embodiment, not shown, a straightening device is provided in the firing line 11 below the pipeline guide member 13.

The pipeline launch device 10 is in this embodiment a pipeline launch tower, which will be described in more detail below. In another, not shown embodiment, the tower could have the 30 form of a derrick (e.g. a latticed framework) extending over the moonpool, wherein the firing line—also referred to as pipeline launch trajectory—passes within the structure of the derrick. Yet alternatively, the tower has the shape of a closed column or mast, wherein the firing line extends parallel to and adjacent the column or mast.

The shown pipeline launch device 10 comprises an elongated A-frame, the legs 10a, 10b of which extend in the direction of the firing line, in particular in the direction of the upper end of the firing line. The vertical legs are interconnected by horizontal crossbeams 10c, 10d.

The legs 10a, 10b are at their lower ends supported on deck 2 by a pivot structure 12, allowing to adjust the inclination of the tower 10. Possibly, one or more telescopic members are arranged between the deck 2 and the tower 10 to adjust the inclination of the tower 10. Commonly, the inclination of the tower 10 can be varied in the range from 0 degrees to 20 degrees from vertical. When desired a smaller or broader range of tower inclination (or even a non-inclinable tower) can be envisaged. When performing J-lay operations it is sometimes desired to arrange the tower at an incline, as is known in the art. It is also known to provide a tower with variable inclination about two perpendicular horizontal axes. It is even possible to have a (free) gimballing tower.

The tower 10 is in the shown embodiment equipped with one pipeline tensioner 15 for controlled lowering/raising a pipeline and to hold the previously launched pipeline, i.e. the lowered portion of the offshore pipeline. In alternative embodiments, two or even more tensioners are applied to perform an even larger number of operations. Tensioners are well known in the art of marine pipelaying. Commonly such a tensioner includes a tensioner frame and a multitude, e.g. four endless tracks supported in a mobile manner in the frame to allow for variation of the gap between the tensioner to at least accommodate various pipeline diameters. In the example shown here the tensioner 15 includes a tensioner frame 16, which is supported by the tower 10 via an associated support assembly 17. In the shown embodiment, the tensioner 15 is supported by a parallel bar linkage 17, which is mounted pivotably to the tower 10 allowing the tensioner frame 16 to be displaceable between an active position, shown in the drawings, in which the firing line 11 extends through the tensioner frame 15 between the tracks, so that the tracks can engage on a tubular, and a retracted and non-operable position wherein the firing line 11 extends outside the frame of the tensioner. In the retracted position the tensioner is accommodated in the opening in the tower between the legs 10a, 10b and cross beams 10c, 10d. This provides a docking station for the tensioner in the retracted position.

According to the invention, the marine pipelaying system 1 comprises a controlled load hoisting device adapted to be releasably secured to one of the one or more accessories and lower/raise said accessory and a lowered portion of the offshore pipeline connected thereto.

On the upper cross beam 10c of the tower, a small crane 18 is provided, applicable for various purposes. This crane 18 is suitable to be used as a controlled load hoisting device according to the invention.

Furthermore, as is common for marine pipelaying vessels, on top of the upper cross beam 10c also an abandonment and recovery (A&R) system 19 is provided, which may also be used as controlled load hoisting adapted to be releasably secured to one of the one or more accessories and lower/raise said accessory and a lowered portion of the offshore pipeline connected thereto.

The A&R system comprises an A&R winch 19a and an A&R cable 19b. The A&R cable 19b is guided over A&R sheaves 19c, which may be arranged so that the A&R cable 19c is aligned with the firing line 11 at the upper end of the tower 10. The A&R cable can thus extend along said firing line 11 downwards.

In the shown embodiment, pipeline launch device 10 is arranged in a centre part of the vessel 3, and the firing line 11 extends through a moonpool 5 in the vessel. Here, the moonpool 5 is covered by two integrated moonpool hatches and pipeline clamps 6a, 6b, that are skiddable along rails 7a, 7b mounted on deck 2 of the vessel. It is advantageous to have such skiddable hatches and pipeline clamps to allow the passage of large accessories in the firing line through the moonpool. The hatches allow personnel and operations close to the firing line during pipelaying.

In alternative, not shown embodiment, the pipeline launch device is positioned at a port or starboard side of the vessel and the firing line extends at a side of the vessel. Yet alternatively, the pipeline launch device is positioned at the stern or aft end side of a vessel and the firing line extends at a distance from the stern of the vessel.

The marine pipelaying system 1 of the inventions further comprises a pipeline clamp adapted to clamp and support—on its own—the weight of the previously launched pipeline in the firing line 11. In the shown embodiment, the pipeline clamp is embodied as a hang-off clamp that is integrated with the moonpool hatches 6a, 6b. The integrated pipeline clamps and hatch panels are embodied such that the pipeline clamp is movable out of the firing line, so that said pipeline clamp or parts thereof are brought to a remote or inactive position, which allows for the lowering of the pipeline and accessory. The accessory can then pass by said moved away pipe clamp. In the drawings, the pipeline clamp is in its closed position.

It can be envisaged that the entire pipeline clamp is displaceable to said remote or inactive position. In can also be envisaged that only moveable parts of the clamp are moved to a remote position, whereas a base structure of the clamp remains stationary. Pipeline clamps wherein both the base structure of the clamp is movable as well as moveable pipeline engaging clamp parts are of course also possible.

The pipeline clamp can be all sorts of designs. For example, it could be of the type engaging beneath a formation, such as a collar or end fitting, on the pipeline as is known in J-lay. It could also be of the type engaging on the pipeline with friction. The friction surfaces of the clamp can be of stationary design, but it could also be of a movable design, commonly referred to as a tensioner having continuous belts with friction pads, engaging on the pipeline.

A pipeline clamp is connected to the vessel, either directly or via the pipeline launch device 10. Commonly, the pipeline clamp is arranged in the lower part of the pipeline launch device. Preferably, the pipeline clamp can be actuated hydraulically.

The marine pipelaying system further comprises an accessory handling device 20 which is adapted to:
  engage said accessory at the engagement position,
  position said accessory in the pipeline connecting position in the firing line above the pipeline clamp, wherein the accessory can be connected to the pipeline,
  support and allow displacement of the accessory between the engagement position and the pipeline connection position.

In the drawings, a PLET (pipeline end termination) 30 is shown, comprising pipeline connection parts 31, 32 at the opposed ends thereof. It is possible to connect pipeline connection part 31 to a lowered portion of the pipeline, held by the pipeline clamp, and it is possible to connect pipeline connection part 32 to a pipeline portion yet to be launched, suspended from tensioner 15.

Not shown in the drawings is an accessory connecting device, adapted to connect the one or more accessories to the offshore pipeline.

With the PLET as shown in the drawings, It is both conceivable that there is a single accessory connecting device that is allowed to move between the lower connection part 31 and upper connection part 32, and that there are two accessory connecting devices at remote locations in the firing line.

The accessory handling device 20 comprises an accessory transport track 21, supported by the pipeline launch device 10 above the pipeline clamp 6a, 6b, extending horizontally and providing an engagement position as shown in FIG. 1 and a pipeline connecting position as shown in FIG. 2a. It is noted that in embodiments, not shown, but within the scope of the invention, the accessory transport track is not supported by the pipeline launch device but by a support structure close to the firing line. In the shown embodiment, the accessory transport track 21 extends beyond one leg 10a of the pipeline launch device, such that the engagement position may be adjacent the pipeline launch device 10.

In the shown embodiment, the accessory transport track 21 extends between the port side and the starboard side of the vessel.

In the shown embodiment, the accessory handling device 20 further comprising two carts 23, movable along the accessory transport track 21 via an associated cart drive (not shown), 15 the cart being adapted to engage and support one of the one or more accessories. Embodiments with only one or three or more carts are also conceivable. In the shown embodiment, wheels 22 of the carts 23 are visible that are guided along the accessory transport track 21.

In the shown embodiment, according to the present invention, elongated hoist beams 24 are supported by the carts 23. In FIG. 1, in an operative position, the elongated hoist beams 24 extend horizontally and perpendicular to the accessory transport track 21. The elongated hoist beams are mounted pivotable to the carts 23 via a horizontal pivot axis 25 by an associated pivot actuator 26, here a hydraulic cylinder provided between cart 23 and hoist beam 24. In FIG. 1 the hoist beams 24 are in the horizontal operational position, while in FIGS. 3a and 3b the elongated hoist beams 24 are shown in an essentially vertical parking position.

The elongated hoist beams 24 comprising trolley rails 27 in the longitudinal direction of the hoist beam, along which a travelling trolley 28 is displaceable by an associated trolley drive (not shown). This is shown in more detail in FIGS. 2b and 3b. An object suspension device 29, here embodied as a hook, is provided which is adapted to engage and support at least one of the one or more accessories. In the shown embodiment, the two object suspension devices 29 engage two rods 33a, 3b, protruding from the PLET 30, and as such engage accessory 30. Not visible is a hoist assembly comprising a hoist winch and an associated hoisting cable. In the detailed drawing of FIG. 2b, a small portion of hoisting cable 35 is visible. The hoisting cable extends from the hoist winch via the travelling trolley to the object suspension device 29, such that upon actuation of the hoist winch the object suspension device can be raised and lowered.

The invention claimed is:
1. A marine pipelaying system to be mounted on a vessel for lowering and/or raising an offshore pipeline and including one or more accessories thereto, the system comprising:
  a pipeline launch device for lowering/raising the offshore pipeline along a firing line defined by the pipeline launch device;
  a pipeline clamp adapted to clamp and support the weight of a lowered portion of the offshore pipeline in the firing line;
  an accessory handling device comprising an accessory transport track supported by the pipeline launch device above the pipeline clamp, extending horizontally and providing an engagement position and a pipeline connecting position, the accessory handling device further comprising a cart, movable along the accessory transport track via an associated cart drive, the cart being adapted to engage and support one of the one or more accessories, such that the accessory handling device is adapted to:
    engage said accessory at the engagement position;
    position said accessory in the pipeline connecting position in the firing line above the pipeline clamp, wherein the accessory can be connected to the pipeline; and
    support and allow displacement of the accessory between the engagement position and the pipeline connection position;
  an accessory connecting device, adapted to connect the one or more accessories to the offshore pipeline; and
  a controlled load hoisting device adapted to be releasably secured to one of the one or more accessories and lower/raise said accessory and a lowered portion of the offshore pipeline connected thereto,
  wherein the accessory handling device further comprises:
    an elongated hoist beam, supported by the cart, extending horizontally and perpendicular to the accessory transport track, comprising trolley rails in the longitudinal direction of the hoist beam;
    a travelling trolley displaceable along the trolley rails, and an associated trolley drive to displace the travelling trolley along the trolley rails;

an object suspension device, adapted to engage and support at least one of the one or more accessories; and a hoist assembly comprising a hoist winch and an associated hoisting cable, the hoisting cable extending from the hoist winch via the travelling trolley to the object suspension device, such that upon actuation of the hoist winch the object suspension device can be raised and lowered.

2. The marine pipelaying system according to claim 1, wherein the elongated hoist beam is mounted pivotable to the cart via a horizontal pivot axis by an associated pivot actuator.

3. The marine pipelaying system according to claim 1, wherein the accessory handling device comprises two carts movable along a common accessory transport track, each cart comprising an elongated hoist beam and associated travelling trolley, object suspension device and hoist assembly, and wherein furthermore a control device is provided to operate both cart drives, trolley drives and hoist assemblies, and possibly also the pivot actuator in cooperation.

4. The marine pipelaying system according to claim 1, comprising a control device to operate the cart drive, trolley drive and hoist assembly so as to position the accessory in the pipeline connecting position in the firing line.

5. The marine pipelaying system according to claim 1, wherein further an accessory line-up tool is provided movable over the accessory transport cart, to which the accessory is attachable and which is operable so as to position the accessory in the pipeline connecting position in the firing line.

6. The marine pipelaying system according to claim 1, wherein the accessory handling device comprises two or more carts and a boom supported by one of the carts, the boom being provided with a gripper, wherein the boom comprises a non-rotatable boom portion connected to the cart and a rotatable boom portion comprising the gripper, which rotatable boom portion is rotatable with respect to the non-rotatable boom portion about a rotation axis of the boom, extending parallel to the firing line.

7. The marine pipelaying system according to claim 1, wherein the pipeline launch device comprises one or more tensioners for lowering/raising the offshore pipeline along the firing line.

8. The marine pipelaying system according to claim 1, wherein the pipeline clamp is movable between the firing line and a remote position, allowing an accessory to be lowered/raised past the pipeline clamp.

9. The marine pipelaying system according to claim 1, wherein the system further includes an accessory loader device for moving an accessory into said engagement position.

10. A marine pipelaying method for lowering and/or raising an offshore pipeline and including one or more accessories thereto, comprising the step of using the marine pipelaying system according to claim 1.

11. The method of claim 10, further comprising the steps of:
providing a vessel with the marine pipelaying system mounted thereon;
lowering the pipeline in the firing line from the vessel;
clamping the pipeline with the pipeline clamp to support the weight of the lowered portion of the offshore pipeline;
providing the accessory in the engagement position of the accessory handling device;
engaging the accessory to the object suspension device;

displacing the accessory from the engagement position to the pipeline connecting position in which the accessory is located above the lowered portion of the offshore pipeline in the pipeline clamp in the firing line, by operating the cart drive and moving the cart along the accessory transport track;
connecting the accessory to the lowered portion of the offshore pipeline above the pipeline clamp, while the pipeline is held by the pipeline clamp;
releasably securing the accessory to the controlled load hoisting device;
transferring the weight of the accessory and the lowered portion of the offshore pipeline connected thereto from the pipeline clamp to the controlled load hoisting device while the accessory and the lowered portion of the offshore pipeline connected thereto remain in the firing line;
disconnecting the accessory from the accessory handling device and displacing the cart away from the pipeline connecting position;
disengaging the pipeline clamp from the pipeline; and
lowering the accessory and the lowered portion of the offshore pipeline connected thereto along the firing line by the controlled load hoisting device.

12. The method according to claim 10, wherein said accessory is positioned in the pipeline connecting position by a control device operating the cart drive, trolley drive and hoist assembly.

13. A marine pipelaying method for lowering and/or raising an offshore pipeline and including one or more accessories thereto, said method comprising the steps of:
providing a vessel with the marine pipelaying system according to claim 1 mounted thereon;
providing the accessory in the engagement position of the accessory handling device;
engaging the accessory to the object suspension device;
displacing the accessory from the engagement position to the pipeline connecting position in which the accessory is located above the lowered portion of the offshore pipeline in the pipeline clamp in the firing line, by operating the cart drive and moving the cart along the accessory transport track;
connecting the accessory to an end portion of the offshore pipeline yet to be launched;
disconnecting the accessory from the accessory handling device and displacing the cart away from the pipeline connecting position; and
lowering the offshore pipeline with the accessory connected thereto along the firing line by the pipeline launch device.

14. A marine pipelaying method for lowering and/or raising an offshore pipeline and including one or more accessories thereto, said method comprising the steps of:
providing a vessel with the marine pipelaying system according to claim 1 mounted thereon;
lowering the pipeline in the firing line from the vessel;
clamping the pipeline with the pipeline clamp to support the weight of the lowered portion of the offshore pipeline;
providing the accessory in the engagement position of the accessory handling device;
engaging the accessory to the object suspension device;
displacing the accessory from the engagement position to the pipeline connecting position in which the accessory is located above the lowered portion of the offshore pipeline in the pipeline clamp in the firing line, by operating the cart drive and moving the cart along the accessory transport track;

connecting the accessory to the lowered portion of the offshore pipeline above the pipeline clamp, while the pipeline is held by the pipeline clamp;

connecting the accessory to a portion of the offshore pipeline yet to be launched;

actuating the pipeline launch device and transferring the weight of the accessory and the lowered portion of the offshore pipeline connected thereto from the pipeline clamp to the pipeline launch device while the accessory and the lowered portion of the offshore pipeline connected thereto remain in the firing line;

disconnecting the accessory from the accessory handling device and displacing the cart away from the pipeline connecting position;

disengaging the pipeline clamp from the pipeline; and lowering the offshore pipeline and the accessory connected thereto along the firing line by the pipeline launch device.

15. An accessory handling device for handling accessories to be included into or onto an offshore pipeline, comprising an accessory transport track adapted to be supported by a pipeline launch device above a pipeline clamp, the accessory handling device extending horizontally and providing an engagement position and a pipeline connecting position, the accessory handling device further comprising a cart, movable along the accessory transport track via an associated cart drive, the cart being adapted to engage and support one of the one or more accessories, such that the accessory handling device is adapted to:

engage said accessory at the engagement position;

position said accessory in the pipeline connecting position in the firing line above the pipeline clamp, wherein the accessory can be connected to the pipeline; and support and allow displacement of the accessory between the engagement position and the pipeline connection position, wherein the accessory handling device further comprises:

an elongated hoist beam, supported by the cart, extending horizontally and perpendicular to the accessory transport track, comprising trolley rails in the longitudinal direction of the hoist beam;

a travelling trolley displaceable along the trolley rails, and an associated trolley drive to displace the travelling trolley along the trolley rails;

an object suspension device, to which an object is connectable, and which is at least adapted to engage and support one of the one or more accessories; and a hoist assembly comprising a hoist winch and an associated hoisting cable, the hoisting cable extending from the hoist winch via the travelling trolley to the object suspension device, such that upon actuation of the hoist winch the object suspension device can be raised and lowered.

* * * * *